(12) United States Patent
Iyengar et al.

(10) Patent No.: US 10,177,768 B2
(45) Date of Patent: Jan. 8, 2019

(54) THRESHOLD VOLTAGE DEFINED SWITCHES FOR PROGRAMMABLE CAMOUFLAGE GATES

(71) Applicants: Anirudh Srikant Iyengar, Tampa, FL (US); Swaroop Ghosh, Tampa, FL (US); Deepakreddy Vontela, Tampa, FL (US); Ithihasa Reddy Nirmala, Tampa, FL (US)

(72) Inventors: Anirudh Srikant Iyengar, Tampa, FL (US); Swaroop Ghosh, Tampa, FL (US); Deepakreddy Vontela, Tampa, FL (US); Ithihasa Reddy Nirmala, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/011,977

(22) Filed: Jun. 19, 2018

(65) Prior Publication Data

US 2018/0302095 A1 Oct. 18, 2018

Related U.S. Application Data

(63) Continuation of application No. PCT/US2017/018925, filed on Feb. 22, 2017.
(Continued)

(51) Int. Cl.
*H01L 29/80* (2006.01)
*G06F 11/07* (2006.01)
(Continued)

(52) U.S. Cl.
CPC ... *H03K 19/17768* (2013.01); *G06F 11/0706* (2013.01); *G06F 11/079* (2013.01);
(Continued)

(58) Field of Classification Search
CPC .......... H03K 19/17768; H03K 17/302; H03K 3/02335; H03K 3/0375; H03K 19/003;
(Continued)

(56) References Cited

U.S. PATENT DOCUMENTS 5,336,624 A   8/1994  Walden
7,128,271 B2* 10/2006 Kim ........................ G06F 21/75
                                                 235/476

(Continued)

OTHER PUBLICATIONS

Iyengar, A. and Ghosh, S., "Threshold Volage-Defined Switches for Programmable Gates," Computer Science and Engineering, University of South Florida, Tampa, FL, Dec. 4, 2015, Fig. 2d, Abstract, p. 1; retrieved Oct. 4, 2017; URL:https://arxiv.org/abs/1512.01581.
(Continued)

*Primary Examiner* — Vibol Tan
(74) *Attorney, Agent, or Firm* — Thomas | Horstemeyer, LLP (57) ABSTRACT

Disclosed are various embodiments providing circuitry that includes camouflaged gates that each have multiple switches arranged in a predefined format. A switch at a specific position in one camouflaged gate can have a different threshold voltage than a switch at the specific position in another camouflaged gate. The logical function performed by the camouflaged gate can be based on which of the switches have a low threshold voltage and which of the switches have a high threshold voltage.

20 Claims, 7 Drawing Sheets

Related U.S. Application Data (60) Provisional application No. 62/298,080, filed on Feb. 22, 2016.

(51) Int. Cl.
*H03K 19/17* (2006.01)
*H03K 19/177* (2006.01)
*G06F 17/50* (2006.01)
*H01L 23/00* (2006.01)
*G06F 21/75* (2013.01)
*H03K 17/30* (2006.01)

(52) U.S. Cl.
CPC ...... *G06F 11/0751* (2013.01); *G06F 11/0793* (2013.01); *G06F 17/50* (2013.01); *G06F 21/75* (2013.01); *H01L 23/57* (2013.01); *H01L 29/80* (2013.01); *H03K 17/302* (2013.01)

(58) Field of Classification Search
CPC .... H03K 19/17764; H03K 2217/94116; G06F 21/75; G06F 17/50; H01L 23/57
See application file for complete search history.

(56) References Cited

U.S. PATENT DOCUMENTS

| | | | | |
|---|---|---|---|---|
| 7,368,935 | B2* | 5/2008 | Bernier | G06F 21/554 326/38 |
| 7,541,266 | B2 | 6/2009 | Chow | |
| 8,418,091 | B2* | 4/2013 | Chow | G06F 17/5045 716/101 |
| 8,980,734 | B2* | 3/2015 | Stephens | H01L 21/28026 438/591 |
| 9,337,156 | B2* | 5/2016 | Kuenemund | H01L 23/576 |
| 9,385,726 | B2* | 7/2016 | Kuenemund | H03K 19/215 |
| 9,496,872 | B1* | 11/2016 | Kuenemund | H03K 19/003 |
| 9,654,111 | B1* | 5/2017 | Muchsel | H03K 19/17736 |
| 9,735,781 | B2* | 8/2017 | Cocchi | G06F 17/5068 |
| 9,940,425 | B2* | 4/2018 | Wang | G06F 17/5068 |
| 10,090,260 | B2* | 10/2018 | Chen | H01L 23/5226 |

OTHER PUBLICATIONS

International Search Report for PCT/US17/18925 dated Nov. 3, 2017.

Iyengar, Anirudh Srikant, "Energy-Efficient and Secure Designs of Spintronic Memory: Techniques and Applications." A dissertation. (2018).

Nirmala, Ithihasa Reddy, et al, "A novel threshold voltage defined switch for circuit camouflaging." Test Symposium (ETS), 2016 21th IEEE European. IEEE, 2016.

Iyengar, Anirudh, Vontela, Deepakreddy and Nirmala, Ithihasa Reddy, "Threshold Defined Logic Engines and Applications," Logics Lab, Computer Science and Engineering, University of South Florida. (2016).

Iyengar, Anirudh S., et al, "Threshold Defined Camouflaged Gates in 65nm Technology for Reverse Engineering Protection." Proceedings of the International Symposium on Low Power Electronics and Design. ACM, 2018.

\* cited by examiner

THRESHOLD VOLTAGE DEFINED SWITCHES FOR PROGRAMMABLE CAMOUFLAGE GATES

CROSS-REFERENCE TO RELATED APPLICATION

This application is a continuation of PCT Application No. PCT/US2017/018925, filed Feb. 22, 2017, entitled "THRESHOLD VOLTAGE DEFINED SWITCHES FOR PROGRAMMABLE CAMOUFLAGE GATES," which claims the benefit of and priority to U.S. Provisional Patent Application No. 62/298,080 filed on Feb. 22, 2016 entitled "THRESHOLD VOLTAGE DEFINED SWITCHES FOR PROGRAMMABLE CAMOUFLAGE GATES," the content of which being incorporated by reference in its entirety herein.

GOVERNMENT LICENSE RIGHTS

This invention was made with government support under Grant Number D15AP00089 awarded by the Defense Advanced Research Projects Agency (DARPA). The government has certain rights in the invention.

BACKGROUND

Semiconductor supply chains are increasingly getting exposed to a variety of security attacks such as Trojan insertion, cloning, counterfeiting, reverse engineering, piracy of Intellectual Property (IP) or Integrated Circuit (IC) and side-channel analysis due to involvement of untrusted parties. Camouflaging is a technique of hiding the circuit functionality of logic gates. A subset of the gates can be chosen for camouflaging to make piracy impossible or extremely hard.

Camouflaging of gates using dummy contacts can realize three functions at the cost of approximately five times the area and power overhead. Process changes can be required to implement dummy contacts. For example, the manufacturing process needs to support generating a hollow via in order to create the dummy contact. Dummy contacts fail to force exhaustive reverse engineering by attackers.

Programmable standard cells can require signal routing for each camouflaged gate. However, current methods of programmable standard cells can require costly manufacturing, such as requiring extra masks. The current methods of programmable standard cells can provide incomplete camouflage by leaving layout clues, increasing design overhead, or offering limited reverse engineering resistance.

SUMMARY

A circuit can include one or more camouflaged gates. The camouflaged gates can include switches arranged in a predefined format. One switch of a camouflaged gate can be doped to have a threshold voltage at a first level, and another switch of the camouflaged gate can be doped to have a threshold voltage at a second level. Each of the switches can be arranged at different locations within the predefined format. The first level can be greater than the second level. A count of switches in each of the camouflaged gates can be either six or eight.

Each camouflaged gate can be a respective one of: an AND gate, an OR gate, an XOR gate, a NAND gate, a NOR gate, or an XNOR gate. The type of gate can be determined by which of the switches are doped to have a threshold voltage equal to the first level. Each of the camouflaged gates can be visually indistinguishable and differ only by which of the respective switches have the threshold voltage at the first level and which have the threshold voltage at the second level.

A circuit can include a first switch of a first logic gate having a first threshold voltage, a second switch of the first logic gate having a second threshold voltage, and a third switch of a second logic gate having the second threshold voltage. The first switch can be located at a first location within a predefined arrangement. The second switch can be located at a second location within the predefined arrangement. The third switch can be located at the first location within the predefined arrangement.

The circuit can include a fourth switch of the second logic gate that has the first threshold voltage which can be located at the second location within the predefined arrangement. Each of the logic gates can include eight switches with two of the switches being doped to have the second threshold voltage and six of the switches being doped to have the first threshold voltage. The first gate and the second gate can be visually indistinguishable. The first gate and the second gate can perform different logical functions. The first threshold voltage and the second threshold voltage can be substantially equidistance from an operating voltage.

A method can include generating a first logic gate on a substrate, generating a second logic gate on the substrate, doping a first switch of the plurality of first switches to have a first threshold voltage, and doping a second switch of the plurality of second switches to have a second threshold voltage. The first logic gate and the second logic gate can include switches arranged in a predefined format. The first switch and the second switch can be located at a first position of the predefined format.

The method can include doping a third switch of the plurality of first switches to have the second threshold voltage and doping a fourth switch of the plurality of second switches to have the first threshold voltage. The third switch can be at a second position of the predefined format, and the fourth switch can be at the second position of the predefined format. The plurality of first switches can include two switches doped to have the second threshold and six switches doped to have the first threshold. The first threshold can be greater than the second threshold. The method can include optimizing a propagation delay for at least one of the first logic gate or the second logic gate and optimizing a switching current for at least one of the first logic gate or the second logic gate. The first threshold and the second threshold can be substantially equidistance from an operating voltage. The first logic gate can occupy a first area on the substrate and the second logic gate can occupy a second area on the substrate. The first area and second area can be equal.

BRIEF DESCRIPTION OF THE DRAWINGS

For a more complete understanding of the embodiments and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

When an electronic circuit is created in a microchip, an adversary can perform invasive reverse engineering (RE) on the microchip to compromise sensitive/classified information or reproduce or sell the pirated copy of the design. The adversary can create a partial netlist with known gates and reverse engineer the missing gate functionalities recursively through carefully selected test patterns. In order to increase the difficulty of reverse engineering a microchip, a camouflaging technique can be used involving $V_T$ modulation of switches.

The $V_T$ modulation can be implemented by changing channel doping concentration during manufacturing. A logic gate that can assume different functions based on doping levels of switches within the logic gate is referred to herein as a camouflaged gate. A circuit can include a combination of logic gates that are camouflaged gates and logic gates that are not camouflaged gates. No layout traces are created when $V_T$ modulation is used to create a camouflaged gate. According to one embodiment, the camouflaged gate can assume six functions to obscure the design. In another embodiment, the camouflaged gate can assume three functions to obscure the design. By camouflaging gates, an attacker can be limited to brute force attacks to reverse engineer a circuit. A camouflaged gate can include a greater area, power, and delay overheads when compared to a non-camouflaged gate. In contrast, a camouflaged gate can have a substantially similar or equal area, power, and delay overhead when compared to another camouflaged gate.

Transistor threshold voltage-defined switches can camouflage a logic gate both logically and physically to resist against reverse engineering and IP piracy. According to one embodiment, a camouflaged gate can function as one of NAND, AND, NOR, OR, XOR, or XNOR robustly using threshold-defined switches. During manufacturing of a camouflaged gate, the channel doping concentration for each switch within the camouflaged gate can be individually set. The function of the camouflaged gate can depend on the channel doping concentrations on the different switches within the camouflaged gate. The camouflaged design operates at a nominal voltage and conforms to conventional reliability requirements. The design of a circuit can be personalized using camouflaged gates during manufacturing.

During manufacturing of a circuit with switches, a channel of a switch can be doped to a concentration corresponding to a $V_T$. This doping of the channel such that the switch has a $V_T$ set to a specific value can be referred to as asserting a $V_T$ on a switch, setting a $V_T$ on a switch, or $V_T$ modulation. Additionally, a switch can be said to assume a $V_T$ when a channel is doped to a concentration that corresponds to the $V_T$.

A switch within a camouflaged gate can turn ON or OFF based on threshold voltage ($V_T$) asserted on it. As an example, if during manufacturing, a channel doping concentration for a switch is set for a $V_T$ of 4 volts, the switch can switch from ON or OFF when a voltage level meets or falls below 4 volts. However, if another switch is manufactured to have a different channel doping concentration, such that the switch has a $V_T$ of 2 volts, the switch can stay ON when the voltage falls below 4 volts but stays above 2 volts.

The switch can be created using conventional NMOS and PMOS transistors with the gate biased at mid-point between nominal N and P threshold voltage, for example $0.5(V_{TN}+V_{TP})$. The switch can conduct when low $V_T$ (LVT) is assigned and stops conducting when high $V_T$ (HVT) is assigned during manufacturing. Switches can be used in conjunction with nominal $V_T$ (NVT) transistors to camouflage the gate. Although the switches can be identified in the layout, the $V_T$ of the switch is opaque. The opacity of the switch can make the configuration secure. The switches can configure the functional of the logic gate to serve as NAND, AND, NOR, OR, XOR, or XNOR. Because the logic gate can assume various functionalities and the $V_T$ is opaque, an adversary can be forced to resort to a brute-force attack. The camouflaged gates can be used as a subset of the total logic gates because of the high overheads. Metrics can guide the selection of which logic gates to camouflage to maximize the required reverse engineering effort for adversaries while lowering overhead and maintaining robustness.

$V_T$ modulation can be possible in current manufacturing processes in the semiconductor industry. $V_T$ based camouflaging can be achieved without process cost increasing. Since $V_T$ programming can be achieved by channel doping during manufacturing the reverse engineering effort required to recreate the circuit will increase. The threshold voltage based camouflaging can require brute force reverse engineering. By camouflaging certain gate sequences, such as an arbitrary gate followed by an XOR/XNOR, the design can be obscured.

According to one example, when considering a 10K design with 50-inputs, if one percentage of gates were camouflaged, at least $2^{50}$ reverse engineering trials could be required which would take $10^5$ years at 1 GHz test frequency. Limited usage of camouflaged gates especially in critical paths can keep the timing, area and power impact below 2-3%. In some embodiments, the camouflaged gates can be used in main stream electronics and services. In other embodiments, camouflaged gates can be used in military electronics, such as satellite, radar, guided missile, unmanned vehicle, rockets, and other electronics.

Obfuscation techniques can hide the functionality of a design by inserting additional components. For sequential circuits, additional logic states can be introduced in a finite state machine to allow a valid state to be reached only using the correct key. In combinational logic, XOR/XNOR gates can be used to conceal functionality. Watermarking and passive metering techniques can detect IC piracy.

These and other aspects, objects, features, and embodiments will become apparent to a person of ordinary skill in the art upon consideration of the following detailed description of illustrative embodiments exemplifying the best mode as presently perceived.

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having," and variations herein, is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, exemplary embodiments are described in detail. A circuit can include one or more camouflaged gates. Each of the camouflaged gates can include switches arranged in a predefined format. In one example, a first switch can be doped to have a threshold voltage at a first level. This first switch can be within a first camouflaged gate and arranged at a first location within the predefined format. A second switch can be doped to have the threshold voltage at a second level and can be from a second camouflaged gate and be arranged at the first location within the predefined format. The first threshold can be greater than the second threshold. In one example, the first threshold is a HVT, and the second threshold is an LVT. The first threshold and the second threshold can be equidistant from an operating voltage.

Each camouflage gate can have a specific number of switches. In some embodiments, a count of switches is based on the number of functions a camouflage gate can perform. In one embodiment, a camouflage gate has eight switches and can perform one of six functions, for example AND, OR, XOR, NAND, NOR, and NXOR. In another embodiment, a camouflage gate has six switches and can perform one of three functions, for example NAND, NOR and INV. A circuit can have a combination of camouflage gates that can be configured to perform one of a differing number of functions. As an example, a circuit can include multiple camouflage gates that each perform one of the six functions and multiple camouflage gates that each perform one of the three functions.

In some embodiments, a buffer circuit can have an input coupled to an output of a camouflage gate. An output of the buffer circuit can mirror the output of the camouflage gate. In some embodiments, the output of the buffer circuit can be inverted relative to the output of the camouflage gate. The output of the camouflage gate can be driven by VDD or ground.

Each camouflage gate can be visually indistinguishable from other camouflage gates. Two camouflage gates that can be configured to perform a common set of functions can differ only by which of the switches within the respective camouflage gate has a threshold voltage set to LVT versus HVT. The camouflage gates can be generated on a substrate, such as silicon. The switches within each camouflage gate can be doped to have a specified threshold voltage.

Figure 1A:
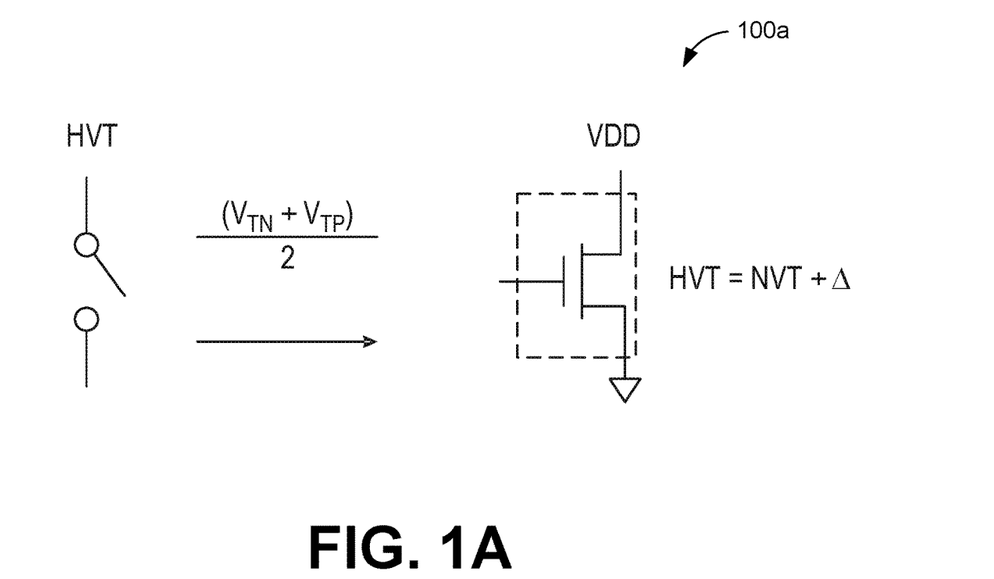
FIGS. 1A and 1B are drawings of threshold voltage defined switches according to various example embodiments.
Figure 1B:
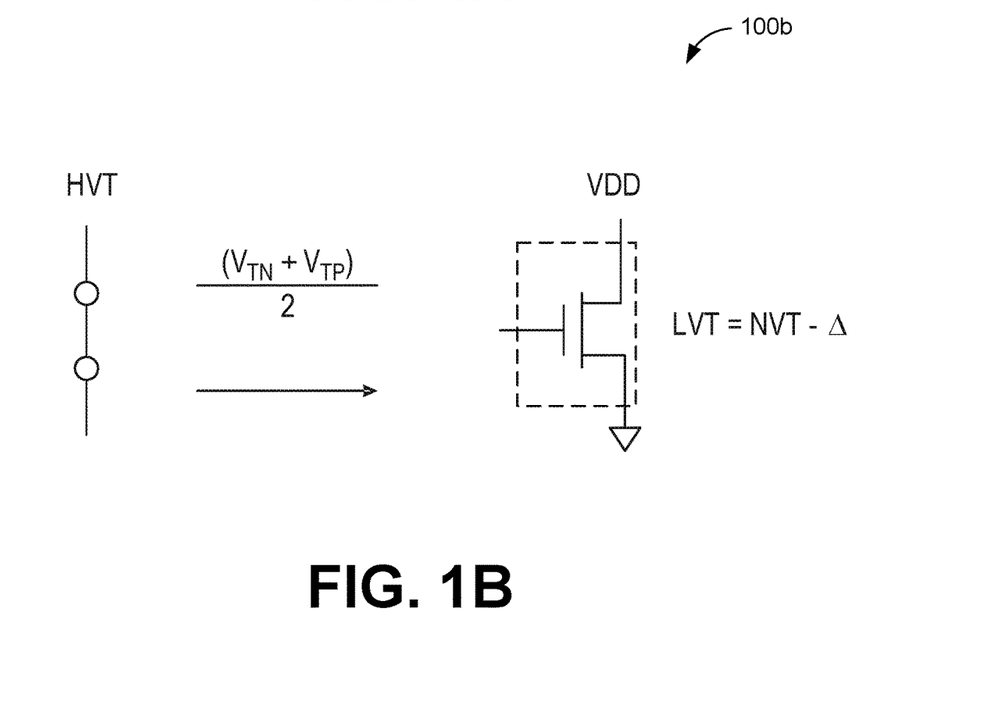

With reference to FIGS. 1A and 1B, shown are switches 100a and 100b from a camouflaged gate according to various embodiments. The camouflaged gate can have multiple switches, each of with can either be a switch 100a or switch 100b. The switch 100a can be made from one or more transistors. The switches 100a and 100b can be identical except for having different threshold voltages ($V_T$). The switches 100a/b can have a high threshold voltage HVT or a low threshold voltage LVT. The HVT can be equal to NVT plus a predefined delta voltage and the LVT can be equal to NVT minus a predefined delta voltage.

In some embodiments, a subset of the switches in a camouflaged gate are be doped with a threshold voltage of HVT while the remaining switches are doped to have a threshold voltage of LVT. A number of functions can be offered based on which of the switches 100a/b within the camouflaged gate are set to HVT or LVT. The camouflaged gate can also be optimized with regard to delay, current usage, and robustness. A camouflaged gate can be generated with a high $I_{ON}/I_{OFF}$ ratio, numerous functionalities, low overhead, and high robustness.

An $I_{ON}/I_{OFF}$ ratio for a switch 100a/b can be quantified. The $I_{ON}/I_{OFF}$ ratio can be based on the $V_T$ for switches 100a/b within a camouflage gate. When the $V_T$ of a switch 100a/b is optimized, the switch 100a/b can provide high ON current and low OFF current. The gate voltage, HVT, LVT values, and transistor sizes can be tuned to maximize the $I_{ON}/I_{OFF}$ ratio. For an N-switch, higher HVT values and lower gate voltage can result in lower leakage. For a P-switch, lower LVT values and higher gate voltage can improve performance. The switch 100a/b can be characterized by whether the switch 100a/b is doped with a $V_T$ set to LVT or HVT values and the switch bias voltage. The switch 100a/b can be optimized to have a high $I_{ON}/I_{OFF}$ ratio and a low delay.

A camouflage gate can be implemented in 45 nm technology among other technologies. The LVT and HVT values can be determined by calculating an offset from the NVT value. The offset can be swept in steps and simulations performed at each step to take measurements regarding delay and electrical characteristics, such as $I_{ON}/I_{OFF}$ In one example, the offset can be swept from 0.1 to 0.5 in steps of 0.05. If the NVT of NMOS transistor is 0.62V, an offset of 0.1 V means that the LVT is 0.52V and HVT is 0.72V.

Figure 2A:
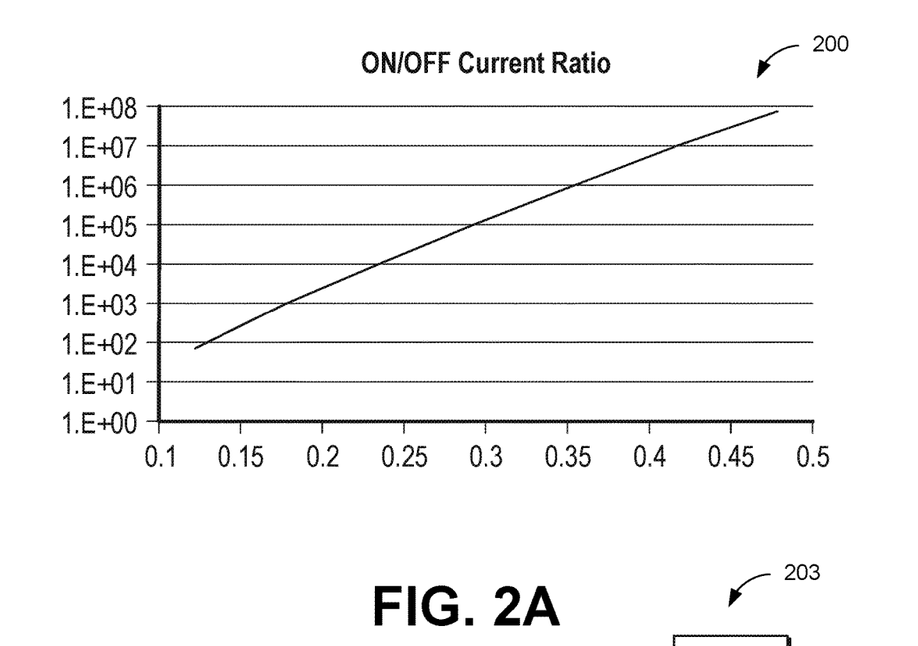
FIGS. 2A-C are graphs of characteristics of a threshold voltage defined logic gate according to various example embodiments.

With reference to FIG. 2A, shown is a graph 200 of an $I_{ON}/I_{OFF}$ ratio with respect to the offset in LVT/HVT values compared to NVT. It can be observed that a high $I_{ON}/I_{OFF}$ ratio can be achieved for low LVT and high HVT values. The delay of various gate topologies implemented using a camouflaged gate can be evaluated.

Figure 2B:
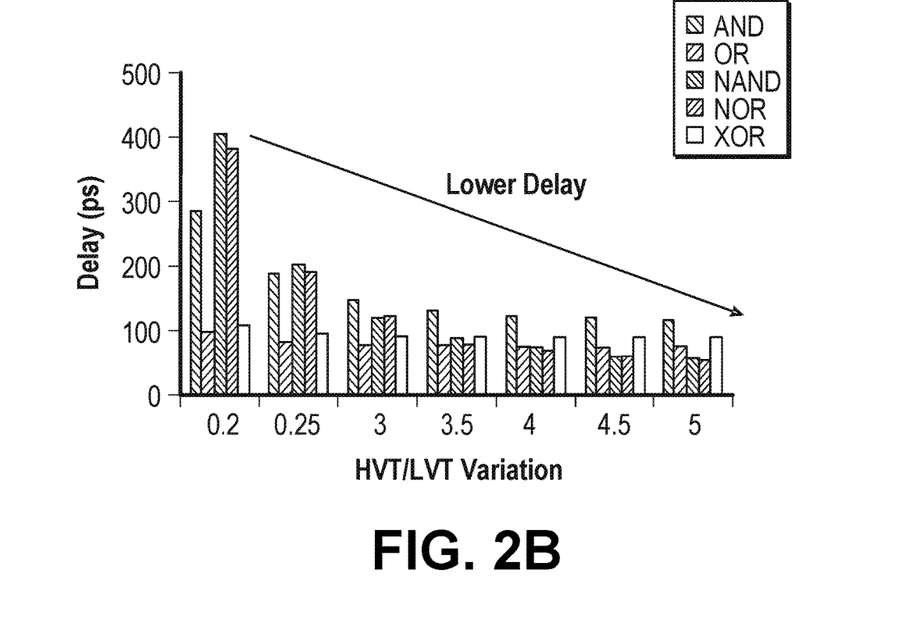

With respect to FIG. 2B, the gate delay with the offset of LVT/HVT values from NVT is shown. The graph 203 illustrates that higher offset can have lower delays. The use of a lower LVT can reduce the resistance of the ON switch. The use of a higher HVT can increase the resistance of the OFF switch.

Figure 2C:
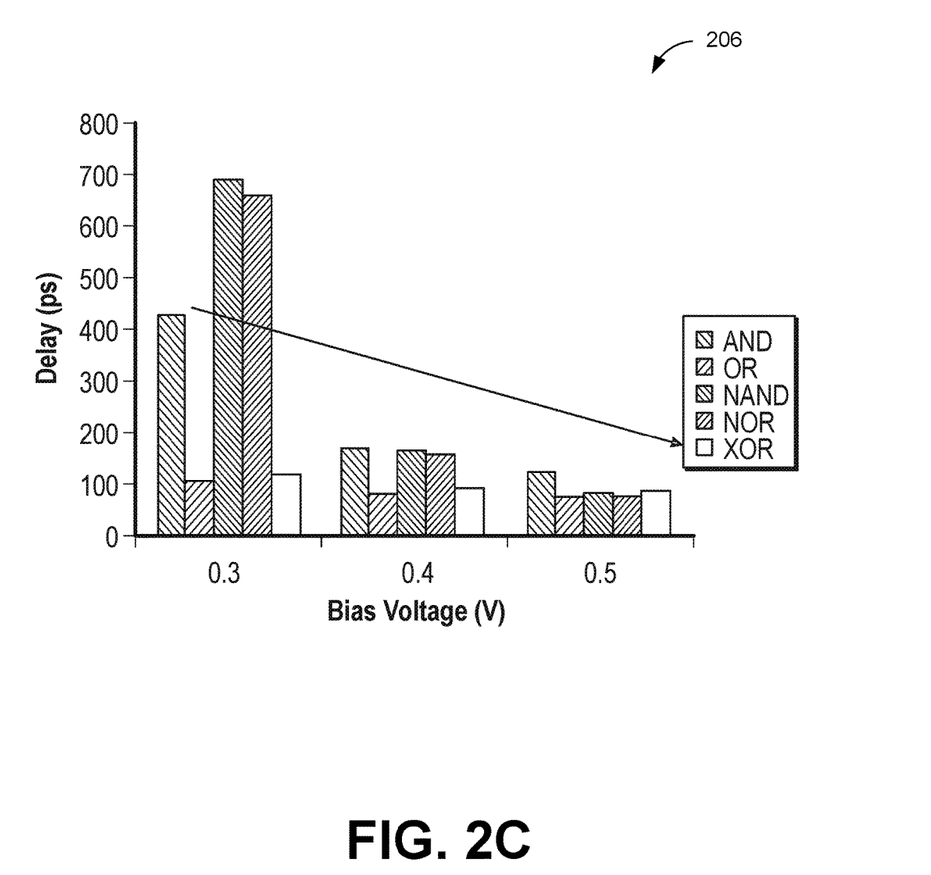

Turning to FIG. 2C, shown is a graph 206 illustrating the impact of switch bias voltage on delay. A higher gate voltage can lower the resistance of an ON switch. An ON switch can be faster when the resistance is lower making the circuit faster. According to one embodiment, an offset of 0.35V from NVT can be selected as optimal for LVT/HVT on an NMOS switch. The switch bias voltage can be selected as 0.48V. Similar analysis can be performed for a PMOS switch.

Figure 3A:
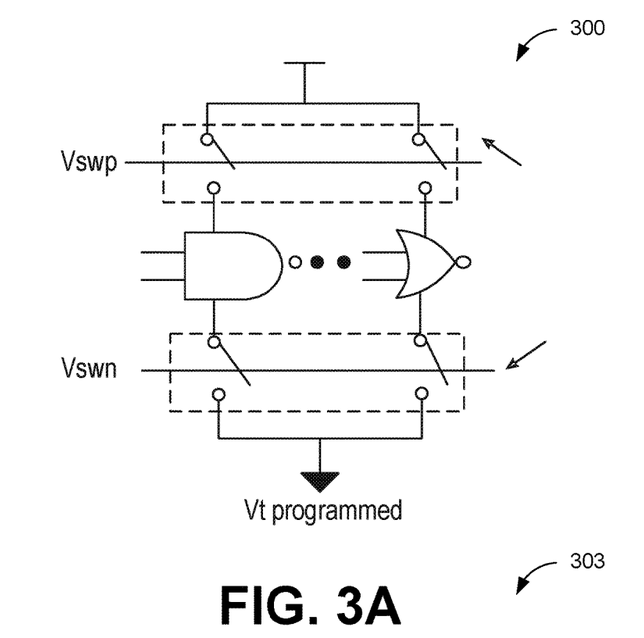
FIGS. 3A-D are schematics and layouts of various logic gates according to various embodiments.

With reference to FIG. 3A, shown is a conceptual schematic 300 of the camouflaged gate that can assume multiple functionalities. The switches that are selected can be doped to have $V_T$ of LVT. The unselected switches can be doped to have a $V_T$ of HVT. The camouflage gate can function with a voltage of NVT. An example schematic 303 and layout 309 that exhibits six functionalities (AND, OR, NAND, NOR, XOR and XNOR) depending on the $V_T$ of switch 1-8 can be seen in FIGS. 3B and 3C. In one embodiment, two switches can be selected for each functionality desired. The ON switches that must be set to LVT in order to realize a particular functionality can be seen in FIG. 3B. As an example, the chart 306 shows which switches to select as ON in schematic 303 for the camouflage gate to perform the functions NAND, NOR, XOR, AND, OR, and XNOR. The layout 309 for any one of the functions listed is visually indistinguishable from any other because doping to vary the threshold voltage for the switch does not change the visual layout. The camouflage gate can be based on pass transistor-based logic.

Figure 3B:
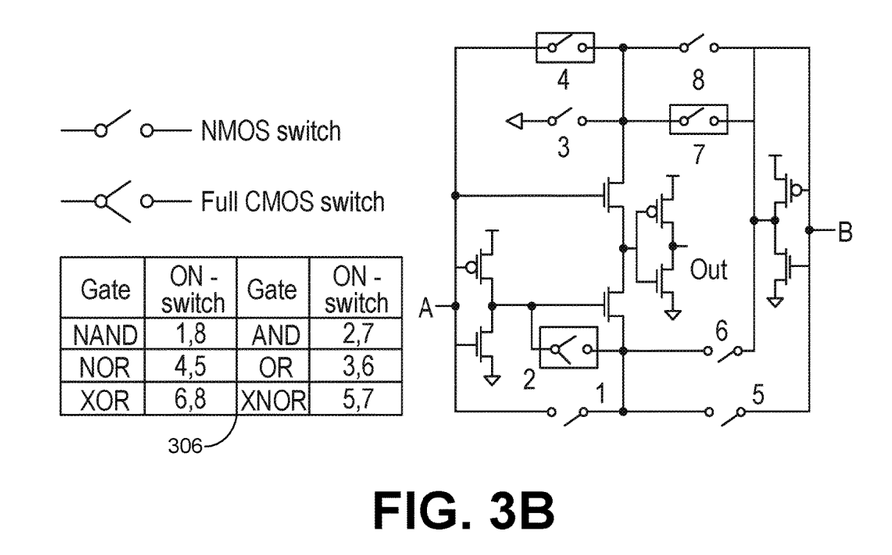

A circuit can include multiple camouflaged gates as shown in FIG. 3B. As a non-limiting example, a circuit can include a NAND camouflaged gate, a NOR camouflaged gate, an XOR camouflaged gate, a second NAND camouflaged gate, and multiple non-camouflaged gates. Each of the camouflaged gates can include switches with threshold voltages set according to chart 306.

For example, by asserting LVT on switches 2 and 7 and HVT on all other switches, a parallel connection of PMOS transistors and a series connections of NMOS transistors can be obtained, and an AND logic can be realized. The design can be optimized to lower delay overhead by tuning the $V_T$ of HVT and LVT transistors, separating the P and N switch gate voltages and biasing them to improve the robustness, and reducing the size of the transistors. The performance and area of a camouflaged gate can be strongly correlated to the resistance of ON and OFF switches in the path.

Below, Table I shows a comparative analysis for area, delay, and power of a camouflage gate with respect to standard gates. As one example, Table I can be generated using HSPICE simulations. In comparison to a standard gate, a camouflaged gate can occupy between 6× and 12× area, incur up to a 2.2× delay, and utilize 17× power overhead depending on the size and functionality of the standard gate. Therefore, the camouflaged gates can be used as a subset of the total gates to maximize reverse engineering effort while staying within the power, performance, and delay overheads.

TABLE I

Simulation results of the proposed camouflage gate and comparison with standard cell values

| Functionality | Area (µm²) | Delay (ps) | Power (µW) |
| --- | --- | --- | --- |
| AND | 2.64 (12.54X) | 130 (1.57X) | 3.5 (13.21X) |
| OR | 2.64 (12.6X) | 76 (0.96X) | 3.12 (10.91X) |

TABLE I-continued

Simulation results of the proposed camouflage gate and comparison with standard cell values

| Functionality | Area (µm²) | Delay (ps) | Power (µW) |
| --- | --- | --- | --- |
| NAND | 2.64 (12.63X) | 89 (2.2X) | 3.47 (16.89X) |
| NOR | 2.64 (12.63X) | 77 (2X) | 3.02 (16.87X) |
| XOR | 2.64 (6.31X) | 90 (1.09X) | 3.11 (8.27X) |
| XNOR | 2.64 (6.31X) | 87 (1.22X) | 3.48 (1.35X) |

As shown in FIG. 3B, the camouflaged gate can suffer from area, power, and delay overheads. The area, power, and delay overheads can be mitigated by simplifying the design by eliminating few switches to realize less functions, considering full CMOS gate structure, and other methods of reducing overhead. To mitigate delay overhead, HVT can be used for off-critical path and LVT for critical paths.

Figure 3C:
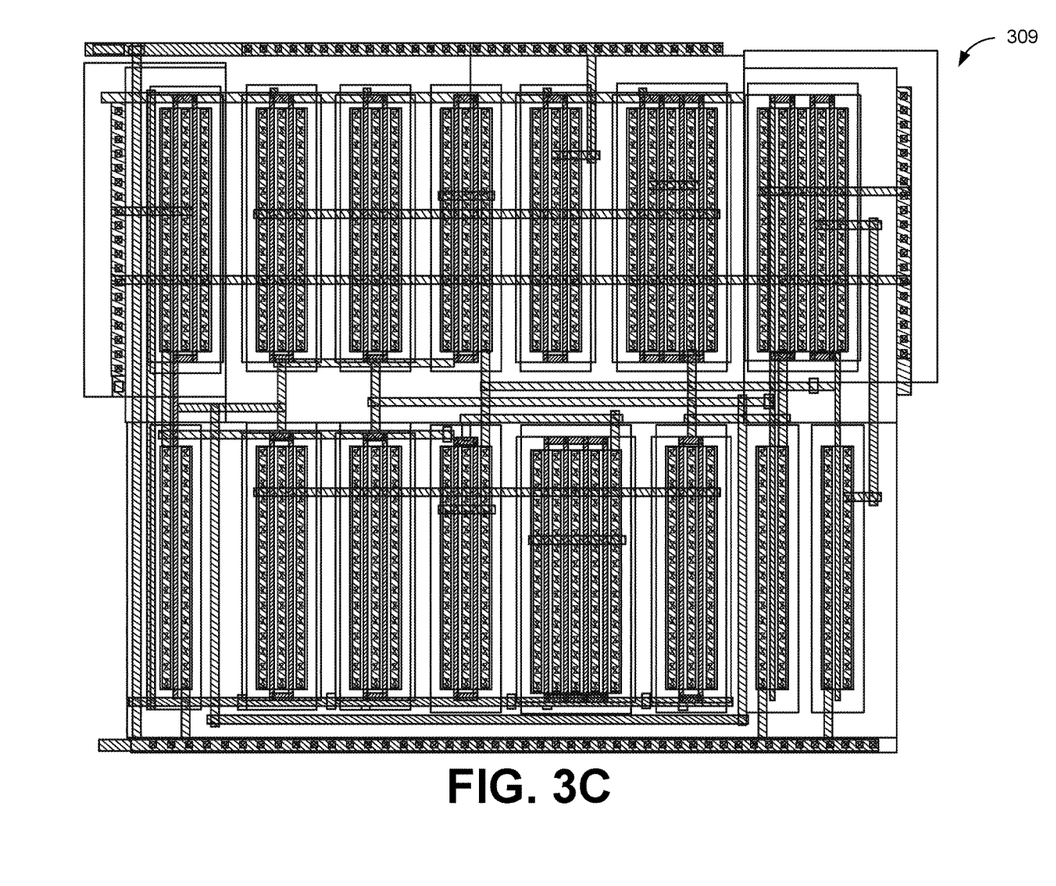
Figure 3D:
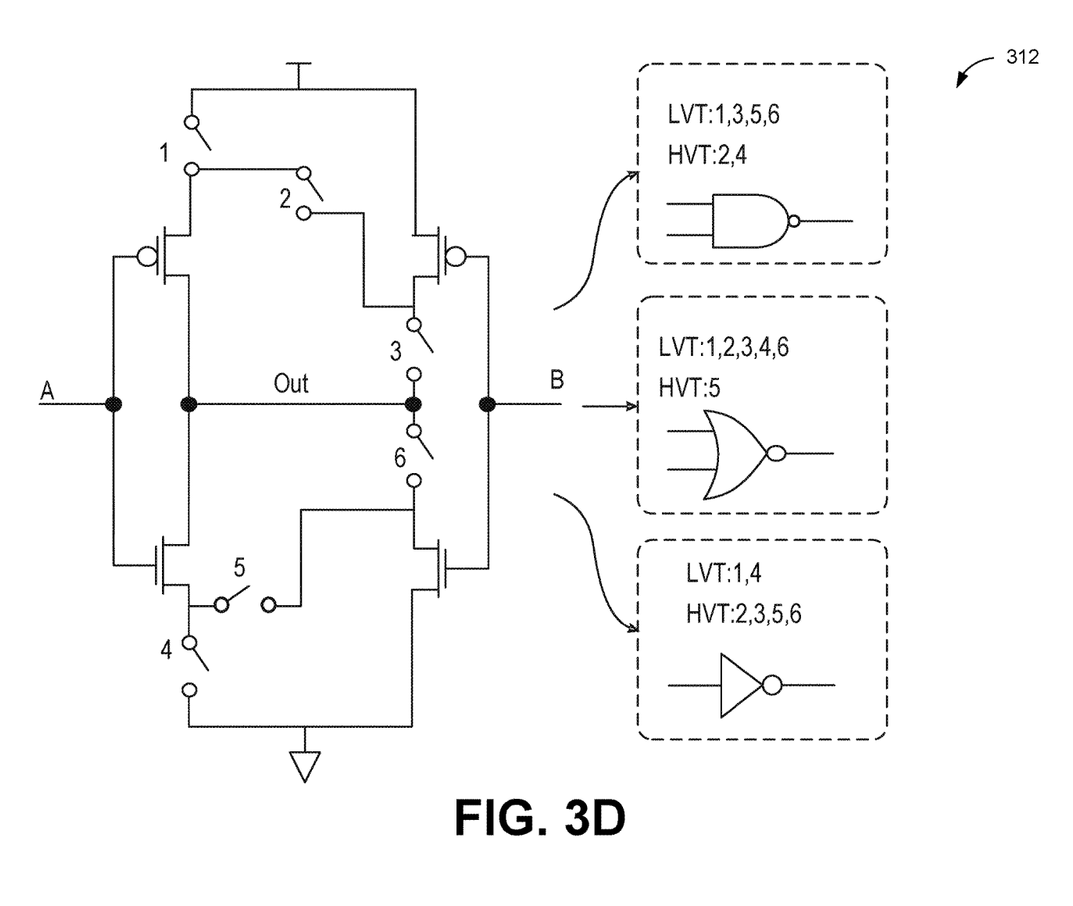

With reference to FIG. 3D, shown is a low-overhead embodiment of a camouflaged gate with three functionalities: NOT, NAND, and NOR. This design can be based on static CMOS. The switches that have to be asserted with HVT and LVT can be seen in FIG. 3D. As one example, if switches 1, 3, 5, and 6 have a threshold voltage of LVT and switches 2 and 4 have a threshold voltage of HVT, the schematic 312 operates as a NAND gate.

Table II shows the comparative analysis of the low-overhead embodiment of the camouflaged gate with respect to standard gate. It can be observed that this camouflaged gate can have 7× area, up to 2× delay and 5× power overhead, which is less than the 6-function camouflaged gate. The three function camouflage gate can have fewer NVT transistors in contrast to a 6-function camouflage gate. As an example, three inverters can be used in a 6-function gate while two inverters can be used in a 3-function gate. The reduction of an inverter can save significant area and power.

For the sake of comparison, Tables III and IV show the area, power, and delay overhead for two existing camouflaged gate flavors. The design complexity of the low-overhead camouflaged gate can be similar to the gates of Tables III and IV. The camouflage gate can be used judiciously in the design to minimize the overall design overhead. System level techniques can be used to minimize the overheads such as converting off-critical path gates to lower delay overhead, using low-activity gates to lower power overhead, and using more complex gates to lower area overhead to camouflaged gate.

TABLE II

Simulation results of 3-function camouflage gate and comparison with standard cell values

| Functionality | Area (µm²) | Delay (ps) | Power (µW) |
| --- | --- | --- | --- |
| NAND | 1.44 (6.89X) | 80 (1.98X) | 0.93 (4.53X) |
| NOR | 1.44 (6.89X) | 58 (1.51X) | 0.92 (5.14X) |
| NOT | 1.44 | 49 | 0.9 |

TABLE III

Simulation results of existing camouflage gate and comparison with standard cell values

| Functionality | Area (µm²) | Delay (ps) | Power (µW) |
| --- | --- | --- | --- |
| OR | 1.44 (6.87X) | 86 (1.09X) | 1.33 (4.65X) |
| AND | 1.44 (6.84X) | 96 (1.16X) | 1.34 (5.06X) |

TABLE IV

Simulation results of existing camouflage gate and comparison with standard cell values

| Function | Camoflauged gate | | | | | |
| --- | --- | --- | --- | --- | --- | --- |
| | XOR + NAND + NOR | | | XNOR + NAND + NOR | | |
| | Power | Delay | Area | Power | Delay | Area |
| NAND | 5.5X | 1.6X | 4X | 5.1X | 1.8X | 4X |
| NOR | 5.1X | 1.1X | 4X | 4.8X | 1.4X | 4X |
| XOR | 0.8X | 0 | 1.2X | | N/A | |
| XNOR | | N/A | | 0.7X | 0 | 1.2X |

The leakage and delay of the camouflaged gate can change with temperature due to $V_T$ variation. An adversary can exploit this variation to perform a side channel analysis to crack the camouflaging. The LVT programmed switches can also be identified using backside probing techniques like LIVA.

The chip can be heated to lower the HVT switch $V_T$ and the chip can be cooled to increase the HVT. The threshold voltage for the switches within a camouflaged gate can be affected by the heating or cooling of the chip. If the switches having a threshold voltage set to HVT are heated to cause the threshold voltage to fall below the nominal voltage, a sneak path can be created from VDD. The leakage sensitivity of NAND can increase compared to NOR for 2'b11 input. Temperature impact on gate delay can be used to obtain different gate delay sensitivities. Different types of camouflaged gates can be balanced to contaminate the leakage and delay signature. Thermal sensors can be used, and the switch gate can be dynamically modulated to kill the leakage.

Figure 4:
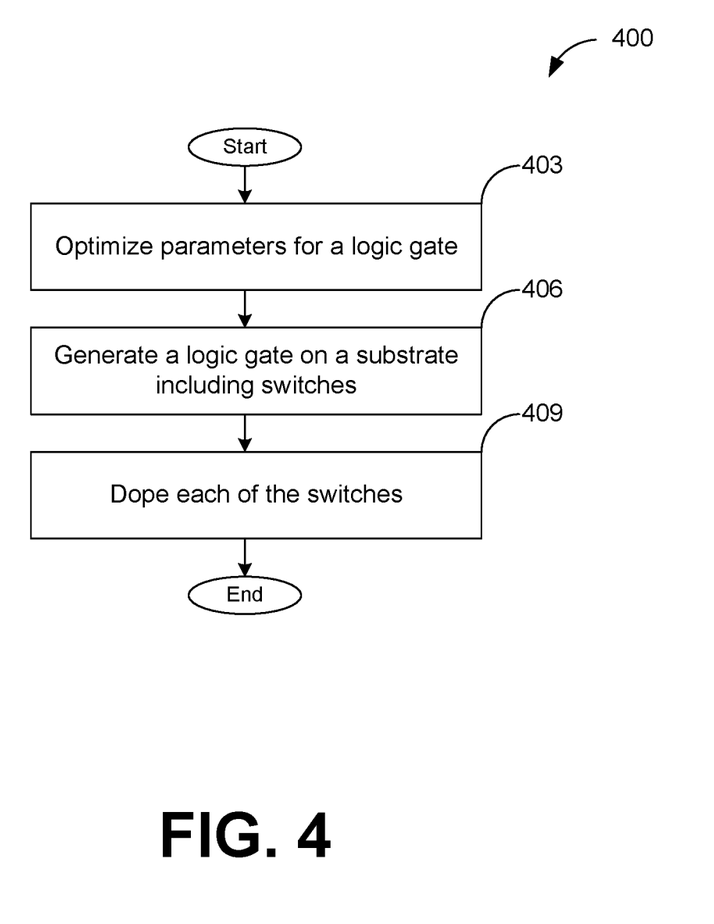
FIG. 4 is an example flowchart of certain functionality for making a logic gate according to various embodiments.

Turning to FIG. 4, shown is a flowchart 400 that provides one example of a process for generating a circuit including a camouflage gate. It is understood that the flowchart of FIG. 4 provides merely an example of the many different types of functional arrangements that may be employed to implement the operation of creating a circuit with a camouflage gate. As an alternative, the flowchart of FIG. 4 can be viewed as depicting an example of elements of a method according to one or more embodiments.

At box 403, the flowchart 400 includes optimizing parameters for a logic gate. For example, an optimizing application, such as HSPICE or other application executed on a computing device, can optimize a propagation delay for one or more logic gates. The optimizing application can optimize a switching current for the one or more logic gates. The optimizing application can optimize the logic gates by tuning the $V_T$ of HVT and LVT transistors, separating the P and N switch gate voltages and biasing them to improve the robustness, and reducing the size of the transistors. By reducing the size of the transistors, the optimizing application can reduce the resistance of the ON and OFF switches in the logic path. The switches within each camouflaged gate can optimized to have a high $I_{ON}/I_{OFF}$ ratio and a low propagation delay.

At box 406, the flowchart 400 includes generating a logic gate on a substrate. For example, a camouflaged gate can be created on the substrate, as shown in FIG. 3C. In some embodiments, the layout 309 is created on a silicon wafer. For example, the circuit can be printed using VLSI technology or another circuit manufacturing process.

At box 409, the flowchart 400 includes doping switches in the camouflaged gate created in box 406. Depending on the positions of the switches and the desired functionality of the camouflaged gate, each of the switches in the camouflaged gate can be doped to have a threshold voltage of HVT or LVT. For example, switches at a first position and an eighth position can be doped to have a threshold voltage of LVT for a first camouflaged gate to create a NAND gate, while switches at the first position and the eighth position are doped to have a threshold voltage of HVT for other camouflaged gates implementing the functionality of AND, OR, XNOR, and/or NOR gates. As another example, a camouflaged gate performing an XOR function can have a switch at the first position doped to have a threshold voltage of HVT and a switch at the eight position doped to have a threshold voltage of LVT. In one embodiment, the ordering of the switches can vary. As a non-limiting example, the eighth position can be referred to as a second position.

The process in flowchart 400 can be iteratively performed once for each camouflaged gate in a circuit design. During each iteration, the same or different function can be implemented in the camouflaged gate by changing which positions have switches doped to have threshold voltages of LVT or HVT.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A circuit comprising:
   a plurality of camouflaged gates, individual ones of the plurality of camouflaged gates comprising a respective plurality of switches arranged in a predefined format;
   a first switch doped to have a threshold voltage at a first level, the first switch being one of the plurality of respective switches from a first camouflaged gate of the plurality of camouflaged gates, the first switch being arranged at a first location within the predefined format; and
   a second switch doped to have the threshold voltage at a second level, the second switch being of the respective plurality of switches from a second camouflaged gate of the plurality of camouflaged gates, the second switch being arranged at the first location within the predefined format.

2. The circuit of claim 1, wherein the first level is greater than the second level.

3. The circuit of claim 1, wherein a count of each of the respective plurality of switches is one of: six or eight.

4. The circuit of claim 1, wherein each of the plurality of camouflaged gates is one of: an AND gate, an OR gate, an XOR gate, a NAND gate, a NOR gate, or an XNOR gate.

5. The circuit of claim 1, wherein a function corresponding to each of the plurality of camouflaged gates is based on which of the respective plurality of switches have a respective threshold voltage at the first level.

6. The circuit of claim 1, wherein the first camouflaged gate and the second camouflaged gate are visually indistinguishable.

7. The circuit of claim 1, wherein the first camouflaged gate and the second camouflaged gate differ only by which of the respective plurality of switches have the threshold voltage at the first level and which of the respective plurality of switches have the threshold voltage at the second level.

8. A circuit comprising:
 a first switch of a first logic gate having a first threshold voltage, the first switch being located at a first location of a plurality of locations within a predefined arrangement;
 a second switch of the first logic gate having a second threshold voltage, the second switch being located at a second location of the plurality of locations within the predefined arrangement; and
 a third switch of a second logic gate having the second threshold voltage, the third switch being located at the first location of the plurality of locations within the predefined arrangement.

9. The circuit of claim 8, further comprising a fourth switch of the second logic gate having the first threshold voltage, the fourth switch being located at the second location of the plurality of locations within the predefined arrangement.

10. The circuit of claim 8, further comprising a plurality of logic gates including the first logic gate and the second logic gate, wherein each of the plurality of logic gates comprise eight switches with two of the switches being doped to have the second threshold voltage and six of the switches being doped to have the first threshold voltage.

11. The circuit of claim 8, wherein the first logic gate and the second logic gate are visually indistinguishable.

12. The circuit of claim 8, wherein the first gate and the second gate perform different logical functions.

13. The circuit of claim 8, wherein the first threshold voltage and the second threshold voltage are substantially equidistance from an operating voltage.

14. A method comprising:
 generating a first logic gate on a substrate, the first logic gate including a plurality of first switches arranged in a predefined format;
 generating a second logic gate on the substrate, the second logic gate including a plurality of second switches arranged in the predefined format;
 doping a first switch of the plurality of first switches to have a first threshold voltage, the first switch being at a first position of the predefined format; and
 doping a second switch of the plurality of second switches to have a second threshold voltage, the second switch being at the first position of the predefined format.

15. The method of claim 14, further comprising:
 doping a third switch of the plurality of first switches to have the second threshold voltage, the third switch being at a second position of the predefined format; and
 doping a fourth switch of the plurality of second switches to have the first threshold voltage, the fourth switch being at the second position of the predefined format.

16. The method of claim 14, wherein the plurality of first switches comprises two switches doped to have the second threshold voltage and six switches doped to have the first threshold voltage, the first threshold voltage being greater than the second threshold voltage.

17. The method of claim 14, further comprising optimizing a propagation delay for at least one of: the first logic gate or the second logic gate.

18. The method of claim 14, further comprising optimizing a switching current for at least one of: the first logic gate or the second logic gate.

19. The method of claim 14, wherein the first threshold voltage and the second threshold voltage are substantially equidistance from an operating voltage.

20. The method of claim 14, wherein the first logic gate occupies a first area on the substrate and the second logic gate occupies a second area on the substrate, and the first area and second area are equal.

* * * * *